(12) United States Patent
Zalcman

(10) Patent No.: US 10,157,649 B1
(45) Date of Patent: Dec. 18, 2018

(54) METHOD AND APPARATUS FOR OPTIMIZING POWER IN FIFO

(71) Applicant: MARVELL ISRAEL (M.I.S.L) LTD., Yokneam (IL)

(72) Inventor: Ohad Zalcman, Magshimim (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 99 days.

(21) Appl. No.: 15/046,005

(22) Filed: Feb. 17, 2016

Related U.S. Application Data

(60) Provisional application No. 62/128,670, filed on Mar. 5, 2015.

(51) Int. Cl.
*G11C 7/10* (2006.01)
*G06F 5/06* (2006.01)
*G06F 1/32* (2006.01)

(52) U.S. Cl.
CPC .......... *G11C 7/1072* (2013.01); *G06F 1/3253* (2013.01); *G06F 1/3275* (2013.01); *G06F 5/065* (2013.01); *G11C 7/1084* (2013.01); *G11C 7/1087* (2013.01); *G06F 2205/067* (2013.01)

(58) Field of Classification Search
CPC ... G11C 7/1072; G11C 7/1084; G11C 7/1087; G06F 1/3253; G06F 1/3275; G06F 5/065; G06F 2205/067
See application file for complete search history.

(56) References Cited

U.S. PATENT DOCUMENTS

| | | | | |
|---|---|---|---|---|
| 5,668,547 A * | 9/1997 | Lee | ......................... | H03M 7/46 341/63 |
| 6,434,642 B1 * | 8/2002 | Camilleri | .................. | G06F 5/12 365/189.07 |
| 6,470,409 B1 * | 10/2002 | Ridgeway | ............. | G06F 13/385 710/10 |
| 6,763,031 B1 * | 7/2004 | Gibson | ................... | H04L 29/06 370/412 |
| 6,772,280 B1 * | 8/2004 | Kamijo | ...................... | G06F 5/10 710/57 |
| 6,813,674 B1 * | 11/2004 | Velasco | ................. | G06F 1/3203 710/309 |
| 7,792,037 B2 * | 9/2010 | Dietrich | ............... | G11C 7/1051 370/235 |
| 8,176,352 B2 * | 5/2012 | Gillespie | ................... | G06F 1/12 327/145 |
| 2012/0311304 A1 * | 12/2012 | Tomono | .............. | G06F 9/30178 712/205 |
| 2014/0351542 A1 * | 11/2014 | Deb | ...................... | G06F 1/3212 711/163 |

OTHER PUBLICATIONS

Sohi, Introduction to Computer Engineering (Year: 2010).*

* cited by examiner

*Primary Examiner* — Ramon A. Mercado

(57) ABSTRACT

Aspects of the disclosure provide a first-in-first-out (FIFO) circuit having a memory block and a logic circuit. The memory block includes an array of memory cells configured to be able to store N data entries in a FIFO order (N is a positive integer). The logic circuit is configured to compare input data with previously input data to detect a number of consecutive identical entries of input data, and suppress an operation of selected memory cells when the number is larger than N.

18 Claims, 3 Drawing Sheets

METHOD AND APPARATUS FOR OPTIMIZING POWER IN FIFO

INCORPORATION BY REFERENCE

This present disclosure claims the benefit of U.S. Provisional Application No. 62/128,670, "POWER OPTIMIZED FREE RUNNING FIFO" filed on Mar. 5, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In electronic circuits, first-in-first-out (FIFO) circuitry is often used for flow control and buffering. For example, in communications and networking, bridges, routers and switches use FIFO circuitry to hold data packets that are in route to a given destination. The FIFO circuitry can be implemented using various memory circuits, such as flip-flops, latches, random access memory (RAM) and the like.

SUMMARY

Aspects of the disclosure provide a first-in-first-out (FIFO) circuit having a memory block and a logic circuit. The memory block includes an array of memory cells configured to be able to store N data entries in a FIFO order (N is a positive integer). The logic circuit is configured to compare input data with previously input data to detect a number of consecutive identical entries of input data, and suppress an operation of selected memory cells when the number is larger than N.

According to an aspect of the disclosure, the memory block is configured to store an entry of input data in response to a clock signal. The logic circuit is configured to gate the clock signal when the number of consecutive identical entries is larger than N. In an example, the memory block includes memory cells implemented in flip-flops.

According to another aspect of the disclosure, the memory block includes memory cells implemented in random access memory (RAM). The logic circuit is configured to mask at least one of a write enable signal and a read enable signal to the memory block when the number of consecutive identical entries is larger than N.

In an example, the FIFO circuit includes a control circuit configured to generate a read pointer and a write pointer according to the FIFO order. The read pointer and the write pointer can be generated independent of the number of consecutive identical entries.

In an embodiment, the logic circuit includes a comparator configured to compare the input data with the previously input data and a counter configured to operate in response to the comparison. In an example, the counter is configured to increment/decrement when the input data is equal to the previously input data and is reset to an initial value in response to the input data being different from the previously input data.

Aspects of the disclosure provide a method. The method includes receiving input data to be stored in a memory block. The memory block includes an array of memory cells configured to be able to store N data entries in a first in first out (FIFO) order. Further, the method includes comparing the input data with previously received input data to detect a number of consecutive identical entries of input data, and suppressing an operation of selected memory cells in the memory block in response to the number of consecutive identical entries being larger than N.

Aspects of the disclosure provide an apparatus having a first-in-first-out (FIFO) circuit. The FIFO circuit includes a memory block having an array of memory cells configured to be able to store N data entries in a FIFO order, and a logic circuit configured to compare an input data with previously input data to detect a number of consecutive identical entries of input data, and suppress an operation of selected memory cells when the number is larger than N.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
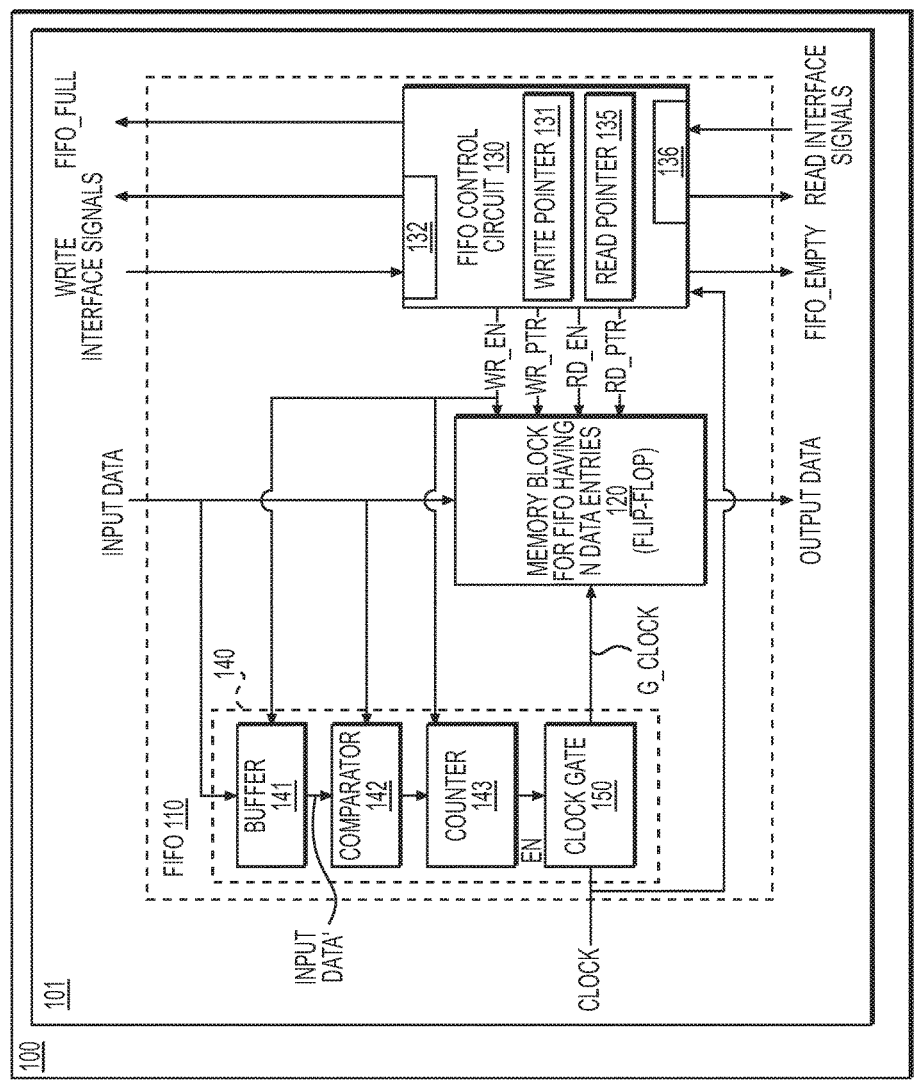
FIG. 1 shows a block diagram of an electronic device 100 according to an embodiment of the disclosure.

FIG. 1 shows a block diagram of an electronic device 100 according to an embodiment of the disclosure. The electronic device 100 includes a first-in-first-out (FIFO) circuit 110 with memory cells being suppressed of operations under certain scenarios. The operation suppression of the memory cells under the certain scenarios does not affect the behavior of the FIFO circuit 110 with other circuits (not shown) that interface with the FIFO circuit 110, but can reduce power consumption by the FIFO circuit 110.

The electronic device 100 can be any suitable devices, such as a desktop computer, a laptop computer, a tablet computer, a cellphone, a smart phone, a network switch, a router, and the like. In an embodiment, the FIFO circuit 110 is implemented on an integrated circuit (IC) chip 101, the IC chip 101 includes other suitable circuits (not shown) that interface with the FIFO circuit 110. In another embodiment, components of the FIFO circuit 110 can be implemented on multiple IC chips.

According to an aspect of the disclosure, the FIFO circuit 110 interfaces with other circuits (not shown) to buffer data in a queue and manipulate the buffered data in a FIFO order. The FIFO circuit 110 communicates with the other circuits via various signals. In the FIG. 1 example, the FIFO circuit 110 receives a clock signal CLOCK, for example from a clock generation circuit (not shown). In response to the clock signal, the FIFO circuit 110 receives input data INPUT DATA, for example, from a data source circuit (not shown) and generates output data OUTPUT DATA, the output data OUTPUT DATA can be provided to, for example, a data destination circuit (not shown).

The FIFO circuit 110 has other suitable interface signals. For example, the FIFO circuit 110 outputs a full indicator FIFO_FULL indicative of whether the queue is full, and an empty indicator FIFO_EMPTY indicative of whether the queue is empty. In the FIG. 1 example, the FIFO circuit 110 receives write control signals and provides write status for write operation, and receives read control signals and provides read status for read operations. The control and status signals can be used by the other circuits (not shown) to control the operation of the FIFO circuit 110. In an example, the control and status signals are used for depth and width expansion.

In the FIG. 1 example, the FIFO circuit 110 is a free running FIFO circuit that receives a free running clock signal CLOCK and operates in response to the free running clock signal CLOCK. The free running clock signal CLOCK toggles in every clock cycle. The toggles of the free running clock signal CLOCK can cause switching activities in transistors and the switching activities in the transistors consume power.

According to an aspect of the disclosure, the FIFO circuit 110 is configured to behave to the other circuits that interface with the FIFO circuit 110 as a free running FIFO circuit, such that the FIFO circuit 110 can be used in the place of a free running FIFO circuit. For example, the signals that are communicated between the FIFO circuit 110 and the other circuits satisfy a free running FIFO specification. Within the FIFO circuit 110, a large portion, such as a memory portion, of the FIFO circuit 110 can be suppressed of operation under certain scenarios to reduce unnecessary switching activities, and thus power consumption can be reduced.

In the FIG. 1 example, the FIFO circuit 110 is a flip-flop based FIFO circuit. Specifically, the FIFO circuit 110 includes a memory block 120, a FIFO control circuit 130 and a suppression control circuit 140 coupled together as shown in FIG. 1. The memory block 120 includes memory cells implemented using flip-flops. The FIFO control circuit 130 provides control signals to the memory block 120 for the FIFO operations. The suppression control circuit 140 receives the free running clock signal CLOCK, and generates a gated clock G_CLOCK with topples suppressed in selected clock cycles corresponding to the certain scenarios.

In the FIG. 1 example, the flip-flops in the memory block 120 receive the gated clock G_CLOCK as a clock signal, and operate in response to the gated clock G_CLOCK. In the FIG. 1 example, the memory block 120 is configured to have a storage capability of N data entries (N is a positive integer). In an example, each data entry has a width of M binary bits (M is a positive integer), and the memory block 120 includes at least N×M flip-flops to form a memory array of N by M memory cells.

According to an aspect of the disclosure, for a flip-flop implementation, even when the input to the flip-flop stays the same, when the clock signal to the flip-flop toggles, some transistors in the flip-flop have switching activities that consume power. In the embodiment, the gated clock signal G_CLOCK is generated to suppress toggles under certain scenarios, and the gated clock signal G_CLOCK is used as the clock signal for the flip-flop, thus, unnecessary switching activities can be reduced for the certain scenarios, and power consumption can be reduced.

The FIFO control circuit 130 provides control signals to the memory block 120 to organize and manipulate a queue in the FIFO order. In the FIG. 1 example, the FIFO control circuit 130 includes a write pointer circuit 131 configured to generate a write pointer signal WR_PTR and a write enable signal WR_EN, and the read pointer circuit 135 configure to generate a read pointer signal RD_PTR and a read enable signal RD_EN.

The FIFO control circuit 130 can include other suitable circuit, such as a write interface 132 for handling write interface signals and a read interface 136 for handing read interface signals. In an example, the write interface 132 can receive an instruction signal for a write operation and can generate a status signal for the write operation; and the read interface 136 can receive an instruction signal for a read operation and can generate a status signal for the write operation.

In an example, the write pointer signal WR_PTR, the write enable signal WR_EN, the read pointer signal RD_PTR, and the read enable signal RD_EN are generated based on the received instructions, and are provided to the memory block 120 to manipulate the queue of data entries.

Specifically, the queue has two ends that are named as a head and a tail in an example. In the example, the head is referred to the data entry that enters the queue at the earliest time, and the tail is referred to the data entry that enters the queue at the latest time. Thus, a data entry enters the queue at the tail and remains in the queue until the data entry reaches the head and leaves the queue from the head.

In an example, the write pointer signal WR_PTR is configured to point to an address of memory cells that stores the tail and the read pointer signal RD_PTR is configured to point to an address of memory cells that stores the head. The write enable signal WR_EN is generated to enable/disable a write operation to en-queue a data entry at the tail of the queue and the read pointer signal RD_PTR is generated to enable/disable a read operation to de-queue a data entry at the head from the queue.

According to an aspect of the disclosure, the FIFO control circuit 130 is configured to operate based on the free running clock signal CLOCK to generate the write pointer signal WR_PTR, the write enable signal WR_EN, the read pointer signal RD_PTR and the read enable signal RD_EN to maintain the free running behavior of the FIFO circuit 110.

For example, when the FIFO circuit 110 receives an instruction for a write operation, in response to a pulse in the clock signal CLOCK, the write pointer circuit 131 updates the write pointer signal WR_PTR to point to a next address for the tail, and then generates the write enable signal WR_EN to enable the write operation that can write a data entry according to the input data INPUT DATA to memory cells at the address pointed by the write pointer signal WR_PTR. When the FIFO circuit 110 receives an instruction for a read operation, in response to a pulse in the clock signal CLOCK, the read pointer circuit 135 generates the read enable signal RD_EN to enable the read operation that generates the output data OUTPUT DATA according to the data entry at the address pointed by the read pointer signal RD_PTR. After the read operation, the read pointer circuit 135 updates the read pointer signal RD_PTR to a next address for the head.

It is noted that the FIFO control circuit 130 can include other suitable circuits (not shown). In an example, the FIFO control circuit 130 includes a circuit to determine and output the full indicator FIFO_FULL and the empty indicator FIFO_EMPTY based on the write pointer signal WR_PTR and the read pointer signal RD_PTR.

The suppression control circuit 140 is configured to generate the gated clock signal G_CLOCK with toggles suppressed under the certain scenarios. In the FIG. 1 example, the suppression control circuit 140 is configured to suppress toggles in the gated clock signal G_CLOCK when N data entries in the memory block 120 are identical. Specifically, the suppression control circuit 140 is configured to detect a number of consecutive identical entries of input data, and when the number of consecutive identical entries of input data is equal to or larger than N, the suppression control circuit 140 suppresses toggles in the gated clock signal G_CLOCK.

In the FIG. 1 example, the suppression control circuit 140 includes a buffer circuit 141, a comparator circuit 142, a counter circuit 143 and a clock gate circuit 150 coupled together as shown in FIG. 1. In an example, the input data INPUT DATA has a width of M binary bits. The buffer circuit 141, the comparator circuit 142 are configured to process M binary bits in parallel.

For example, the buffer circuit 141 includes M registers configured to buffer the input data INPUT DATA. The buffered input data INPUT DATA becomes the previously input data INPUT DATA' when new input data INPUT DATA is received. In the example, the buffer circuit 141 receives the write enable signal WR_EN and the clock signal CLOCK, and operates based on the write enable signal and the clock signal CLOCK. For example, when the write enable signal WR_EN is in a state to enable the write operation, the buffer circuit 141 buffers the input data INPUT DATA in response to, for example, a rising edge in the clock signal CLOCK.

Further, in an example, the comparator circuit 142 compares by bitwise the previously input data INPUT DATA' with the new input data INPUT DATA. For example, the comparator circuit 142 includes M units of bit-comparison circuit. Each unit of the bit-comparison circuit compares a bit in the previously input data INPUT DATA' with a corresponding bit in the new input data INPUT DATA.

In an embodiment, the counter circuit 143 is configured to operate in response to the comparison result from the comparator circuit 142 in order to detect a number of consecutive identical data entries in the input data INPUT DATA. The counter circuit 143 increments or decrements when the previously input data INPUT DATA' is identical to the new input data INPUT DATA and the write enable signal WR_EN is asserted, and resets to an initial value when the previously input data INPUT DATA' is different from the new input data INPUT DATA.

In an example, the counter circuit 143 is configured to increment by one when the previously input data INPUT DATA' is identical to the new input data INPUT DATA and the write enable signal WR_EN is asserted, and is configured to be reset to one when the previously input data INPUT DATA' is different from the new input data INPUT DATA. Thus, when the counter circuit 143 has a counted value of N, N consecutive identical data entries have entered the memory block 120.

In an example, the counter circuit 143 generates a clock gating enable signal EN based on the counter input (comparison result) and the counted value. For example, when the comparison result is indicative of non-identical INPUT DATA entering the FIFO, the clock gating enable signal EN is generated not to gate the clock signal, such that the non-identical INPUT DATA is written to the memory block 120 in the same cycle. Further, in the example, when the comparison result is indicative of identical INPUT DATA entering the FIFO, and when the counted value is less than and equal to N, the counter circuit 143 outputs a first value, such as binary one, as the clock gating enable signal EN to enable the clock signal (G_CLOCK toggles), and when the counted value is larger than N, the counter circuit 143 outputs a second value, such as binary zero, as the clock gating enable signal EN to gate the clock signal (G_CLOCK does not toggle). In an example, the counter circuit 143 is implemented with a width of $\log_2(N)$ to minimize circuit footprint. It is noted that in an embodiment, the counter 143 is implemented not to increment above N+1 to prevent wraparound that may wrongly enable the clock signal.

It is noted that the counter circuit 143 can be implemented in other manner. In an example, the counter circuit 143 can be implemented to decrement by one when the previously input data INPUT DATA' is identical to the new input data INPUT DATA. In an example, the counter circuit 143 can be implemented to increment by other suitable number, such as two, and the like when the previously input data INPUT DATA' is identical to the new input data INPUT DATA. In another example, the counter circuit 143 is configured to be reset to other suitable number, such as a binary representation of N, and the like when the previously input data INPUT DATA' is different from the new input data INPUT DATA.

The clock gate circuit 150 is configured to suppress toggles in the clock signal CLOCK to generate the gated clock signal G_CLOCK in response to the clock gating enable signal EN of the counter circuit 143. For example, when the clock gating enable signal is binary one, the clock gate circuit 150 does not suppress toggles, such that the gated clock signal G_CLOCK follows the clock signal CLOCK; and when the clock gating enable signal EN is binary zero, the clock gate circuit 150 suppresses toggles in the gated clock signal G_CLOCK. The clock gate circuit 150 can be implemented using any suitable circuit techniques, such as logic circuit, multiplexer, and the like.

According to an aspect of the disclosure, the number of transistors in the suppression control circuit 140 and the FIFO control circuit 130 is much smaller than the number of transistors in the memory block 120. In an embodiment, the circuit components in the suppression control circuit 140 and the FIFO control circuit 130 can operate based on the clock signal CLOCK without causing significant power consumption.

Figure 2:
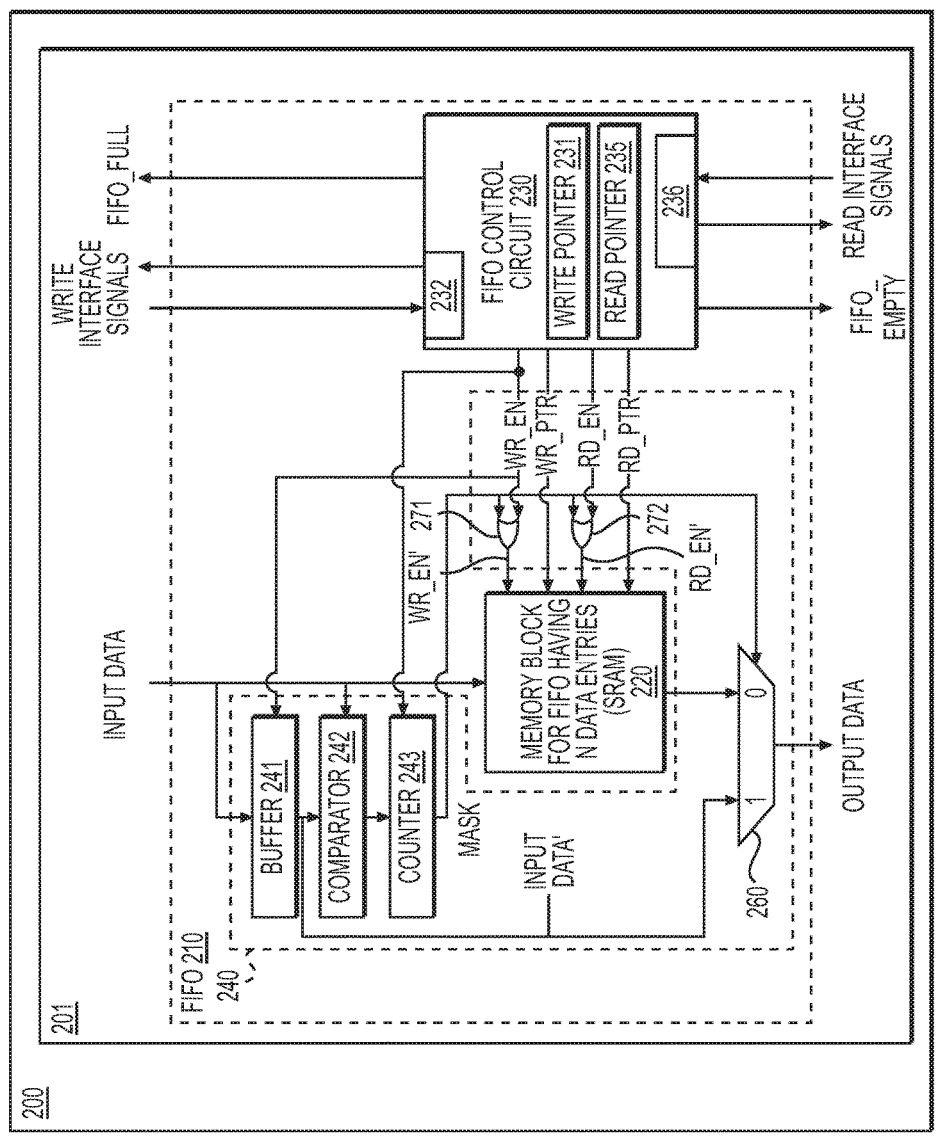
FIG. 2 shows a block diagram of an electronic device 200 according to an embodiment of the disclosure.

FIG. 2 shows a block diagram of an electronic device 200 according to an embodiment of the disclosure. The electronic device 200 operates similarly to the electronic device 100 described above. The electronic device 200 also utilizes certain components that are identical or equivalent to those used in the electronic device 100; the description of these components has been provided above and will be omitted here for clarity purposes. However, in this embodiment, the electronic device 100 is structurally different in a number of respects.

In the FIG. 2 example, the memory block 220 is implemented using random access memory (RAM), such as static random access memory (SRAM), and the like. In an example, the memory block 220 is implemented using an SRAM array with suitable peripheral circuits, such as row decoders, column decoders, sense amplifiers, input registers, output registers and the like. The SRAM array can receive address signals and read/write control signals, and operate accordingly.

In the FIG. 2 example, the memory block 220 is configured to have a storage capability of N data entries (N is a positive integer and can be referred to as a depth). In an example, each data entry has a width of M binary bits (M is a positive integer and can be referred to as a width), and the memory block 220 includes N×M SRAM memory cells to form a memory array for a maximum of N data entries.

According to an aspect of the disclosure, for the SRAM implementation, read activities and write activities consume significant power. The read activities and the write activities are controlled by the read/write control signals. In an embodiment, the read/write control signals are masked under certain scenarios to suppress the read activities and the write activities in the memory array, and thus unnecessary read and write activities can be reduced under the certain scenarios, and power consumption can be reduced.

The suppression control circuit 240 is configured to mask the read/write control signals under the certain scenarios. In the FIG. 2 example, the FIFO control circuit 230 is similarly configured according to the FIFO control circuit 130 in the FIG. 1 example to generate the write pointer signal WR_PTR, the write enable signal WR_EN, the read pointer signal RD_PTR and the read enable signal RD_EN. The suppression control circuit 240 is configured to mask the read enable signal RD_EN and the write enable signal WR_EN when the N consecutive data entries or more than N consecutive data entries that enter to the memory block 220 are the same.

In the FIG. 2 example, the suppression control circuit 240 includes a buffer circuit 241, a comparator circuit 242, a counter circuit 243, a multiplexer 260, and mask circuits 271-272 coupled together as shown in FIG. 2. The buffer circuit 241 is similarly configured as the buffer circuit 141, the comparator circuit 242 is similarly configured as the comparator circuit 142, and the counter circuit 243 is similarly configured as the counter circuit 143. The description of these components has been provided above and will be omitted here for clarity purposes.

The multiplexer 250 is configured to select data for output based on a mask signal MASK output from the counter circuit 243. In an example, the counter circuit 243 is configured to output binary value zero as the mask signal MASK when the counted number is smaller than and equal to N, and output binary value one as the mask signal MASK when the counted number is larger than N. Thus, when the mask signal MASK is binary zero, output registers from the memory block 220 are selected to generate the output data OUTPUT DATA, and when the mask signal MASK is binary one, the buffer circuit 241 is selected to generate the output data OUTPUT DATA.

The mask circuits 271-272 can be implemented using any suitable logic circuits to mask the read enable signal RD_EN and the write enable signal WR_EN. In the FIG. 2 example, the mask circuit 271 generates a masked write enable signal WR_EN' based on the write enable signal WR_EN and the mask signal MASK, and the mask circuit 272 generates a masked read enable signal RD_EN' based on the read enable signal RD_EN and the mask signal MASK.

Specifically, in the FIG. 2 example, the mask circuits 271-272 are implemented using OR logic. When the mask signal MASK is binary zero, the masked read enable signal RD_EN' follows the read enable signal RD_EN, and the masked write enable signal WR_EN' follows the write enable signal WR_EN. The memory block 220 then operates based on the read enable signal RD_EN and write enable signal WR_EN. When the mask signal MASK is binary one, the masked read enable signal RD_EN' stays at binary one, and the masked write enable signal WR_EN' stays at binary one. The read and write operations in the memory block 220 are suppressed.

It is noted that in the FIG. 2 example, the memory block 220 is implemented in the manner that the masked write enable signal WR_EN' and the masked read enable signal RD_EN' are active low (binary zero to enable read or write to the memory block 220), thus the WR_EN' and RD_EN' signals can be generated by using the OR gates 271 and 272 accordingly, and the mask signal MASK is active high (binary 1 to mask). In another example, when the memory block 220 is implemented in the manner that the masked write enable signal WR_EN' and the masked read enable signal RD_EN' are active high, the mask circuits 271-272 can be implemented using AND gates, and the mask signal MASK is active low. In addition, the selector polarity of the MUX 260 needs to be suitably adjusted. For example, when the mask signal MASK is active low, the selector polarity of MUX 260 is opposite to what is shown in FIG. 2.

It is noted that, in the FIG. 2 example, a clock signal CLOCK which can be a free running clock signal is not shown. In an embodiment, the circuit components in the suppression control circuit 240 and the FIFO control circuit 230 operate based on the clock signal CLOCK. In another embodiment, the suppression control circuit 240 can include a clock gate circuit similarly to the clock gate circuit 150 to generate a gated clock signal to be used in the memory block 220.

Figure 3:
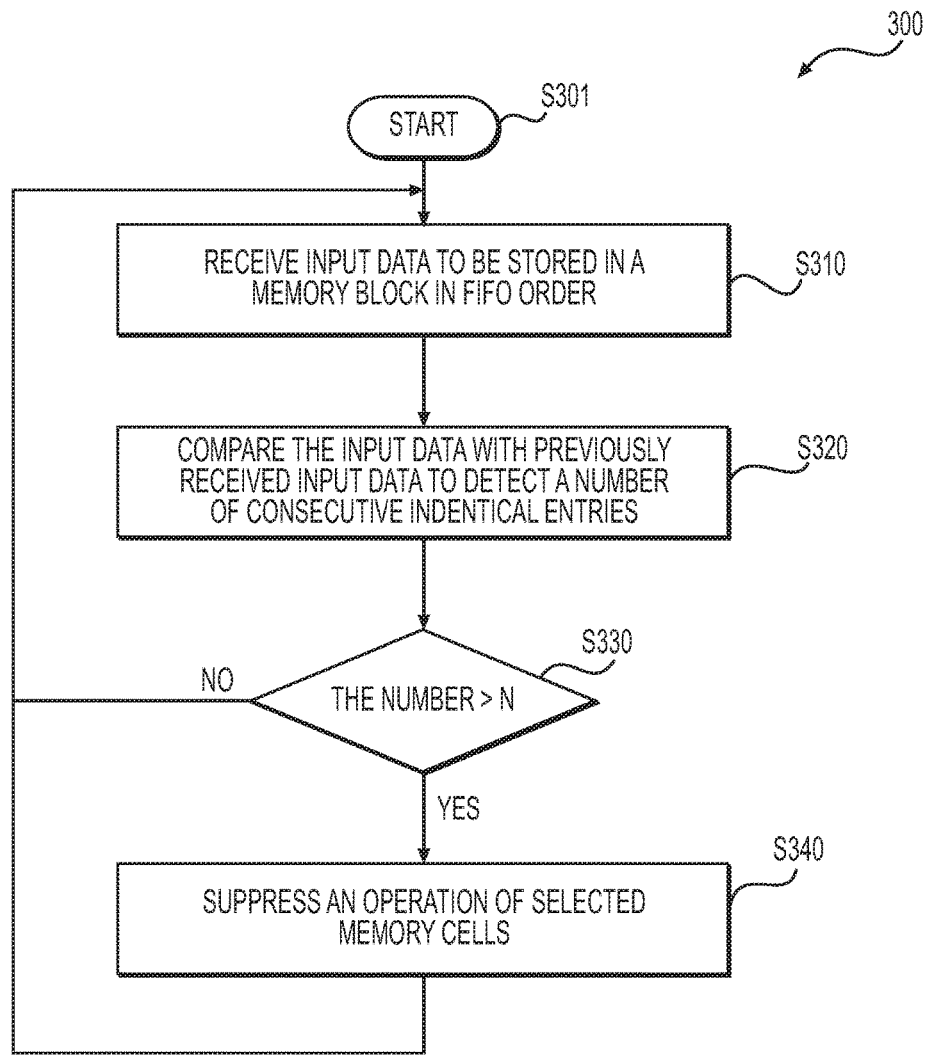
FIG. 3 shows a flow chart outlining a process 300 according to an embodiment of the disclosure.

FIG. 3 shows a flow chart outlining a process 300 according to an embodiment of the disclosure. The process 300 can be executed by a suppression control circuit, such as the suppression control circuit 140, the suppression control circuit 240, and the like. The process starts at S301 and proceeds to S310.

At S310, input data to be stored in a memory block in FIFO order is received. In the FIG. 1 example, the FIFO control circuit 130 provides control signals to the memory block 120 to enable the FIFO order, and the memory block 120 includes memory cells implemented using flip-flops. In the FIG. 2 example, the FIFO control circuit 230 provides control signals to the memory block 220 to enable the FIFO order, and the memory block 220 includes memory cells implemented using RAM cells. The memory block 120 and the memory block 220 are configured to have a storage capability of N data entries.

At S320, the input data is compared with previously received input data to detect a number of consecutive identical entries. In the FIG. 1 example, the buffer circuit 141 buffers the previously input data INPUT DATA'. The comparator circuit 142 compares by bitwise the previously input data INPUT DATA' with the new input data INPUT DATA. The counter circuit 143 is configured to increment by one when the previously input data INPUT DATA' is identical to the new input data INPUT DATA, and is configured to be reset to zero when the previously input data INPUT DATA' is different from the new input data INPUT DATA. Thus, the counted value is indicative of a number of consecutive identical data entries that have entered the memory block 120.

At S330, when the number of consecutive identical entries is larger than N, the process proceeds to S340; otherwise, the process returns to S310. In the FIG. 1 example, when the counted value is greater than N in an example, the counter circuit 143 outputs binary zero as the clock gating enable signal EN; otherwise, the counter circuit 143 outputs binary one as the clock gating enable signal EN. In the FIG. 2 example, when the counted value is greater than N in an example, the counter circuit 243 outputs binary one as the mask signal MASK; otherwise, the counter circuit 243 outputs binary zero as the mask signal MASK.

At S340, the operation of selected memory cells is suppressed of operation. In the FIG. 1 example, the clock gate circuit 150 suppresses toggles in the clock signal CLOCK to generate the gated clock signal G_CLOCK when the clock gating enable signal EN is binary zero. Thus, switching activities in flip-flops within the memory block 120 are suppressed. In the FIG. 2 example, the mask circuits 271-272 mask the read enable signal RD_EN and the write enable signal WR_EN when the mask signal MASK is binary one. The masked read enable signal RD_EN' stays at binary one, and the masked write enable signal WR_EN' stays at binary one. The read and write operations in the memory block 220 are suppressed. The process then returns to S310.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A circuit, comprising:
   a memory block implemented with a first set of transistors, the memory block having an array of memory cells configured to be able to store N data entries in a first in first out (FIFO) order in response to a clock signal; and
   a logic circuit implemented with a second set of transistors, the logic circuit configured to compare current input data with previously input data to detect a number of consecutive identical entries of input data, the number of consecutive identical entries of input data being counted by a counter, which is reset to an initial value in response to the input data being different from the previously input data, store the current input data in the FIFO when the number is equal to or less than N, and suppress storing of the current input data when the number is larger than N by gating the clock signal even when the FIFO is not full.

2. The circuit of claim 1, wherein the memory block includes memory cells implemented in flip-flops.

3. The circuit of claim 1, wherein:
   the memory block includes memory cells implemented in random access memory (RAM); and
   the logic circuit is configured to mask at least one of a write enable signal and a read enable signal to the memory block when the number of consecutive identical entries is larger than N.

4. The circuit of claim 1, further comprising:
   a control circuit configured to generate a read pointer and a write pointer according to the FIFO order, the read pointer and the write pointer being generated independent of the number of consecutive identical entries.

5. The circuit of claim 1, wherein the logic circuit comprises:
   a comparator configured to compare the input data with the previously input data; and
   the counter configured to operate in response to the comparison.

6. The circuit of claim 5, wherein the counter is configured to increment/decrement when the input data is equal to the previously input data.

7. A method, comprising:
   receiving input data to be stored in a memory block implemented with a first set of transistors, the memory block having an array of memory cells configured to be able to store N data entries in a first in first out (FIFO) order in response to a clock signal;
   comparing, by a logic circuit implemented with a second set of transistors, the input data with previously received input data to detect a number of consecutive identical entries of input data, the number of consecutive identical entries of input data being counted by a counter, which is reset to an initial value in response to the input data being different from the previously input data; and
   storing the input data in the FIFO when the number is equal to or less than N;
   suppressing the storing of the input data when the number of consecutive identical entries being larger than N by gating the clock signal even when the FIFO is not full.

8. The method of claim 7, further comprising:
   providing the gated clock signal to the memory block that includes memory cells implemented using flip-flops.

9. The method of claim 7, wherein:
   masking at least one of a write enable signal and a read enable signal to the memory block implemented using random access memory when the number of consecutive identical entries is larger than N.

10. The method of claim 7, further comprising:
    generating a read pointer and a write pointer according to the FIFO order independent of the number of consecutive identical entries.

11. The method of claim 7, further comprising:
    comparing the input data with the previously input data; and
    counting a value of the counter in response to the comparison.

12. The method of claim 11, wherein counting the value in response to the comparison further comprises:
    incrementing/decrementing the value of the counter when the input data is equal to the previously input data.

13. An apparatus having a first-in-first-out (FIFO) circuit, the FIFO circuit comprising:
    a memory block implemented with a first set of transistors, the memory block having an array of memory cells configured to be able to store N (N is a positive integer) data entries in a FIFO order in response to a clock signal; and
    a logic circuit implemented with a second set of transistors, the logic circuit configured to compare current input data with previously input data to detect a number of consecutive identical entries of input data, the number of consecutive identical entries of input data being counted by a counter, which is reset to an initial value in response to the input data being different from the previously input data, store the current input data in the FIFO when the number is equal to or less than N, and suppress storing of the current input data when the number is larger than N by gating the clock signal even when the FIFO is not full.

14. The apparatus of claim 13, wherein the memory block includes memory cells implemented in flip-flops.

15. The apparatus of claim 13, wherein:
    the memory block includes memory cells implemented in random access memory; and
    the logic circuit is configured to mask at least one of a write enable signal and a read enable signal to the memory block when the number of consecutive identical entries is larger than N.

16. The apparatus of claim 13, further comprising:
    a control circuit configured to generate a read pointer and a write pointer according to the FIFO order, the read pointer and the write pointer being generated independent of the number of consecutive identical entries.

17. The apparatus of claim 13, wherein the logic circuit comprises:
    a comparator configured to compare the input data with the previously input data; and the counter configured to increment/decrement when the input data is equal to the previously input data.

18. The circuit of claim 1, wherein a number of the second set of transistors is smaller than a number of the first set of transistors.

\* \* \* \* \*